Patented Feb. 7, 1928.

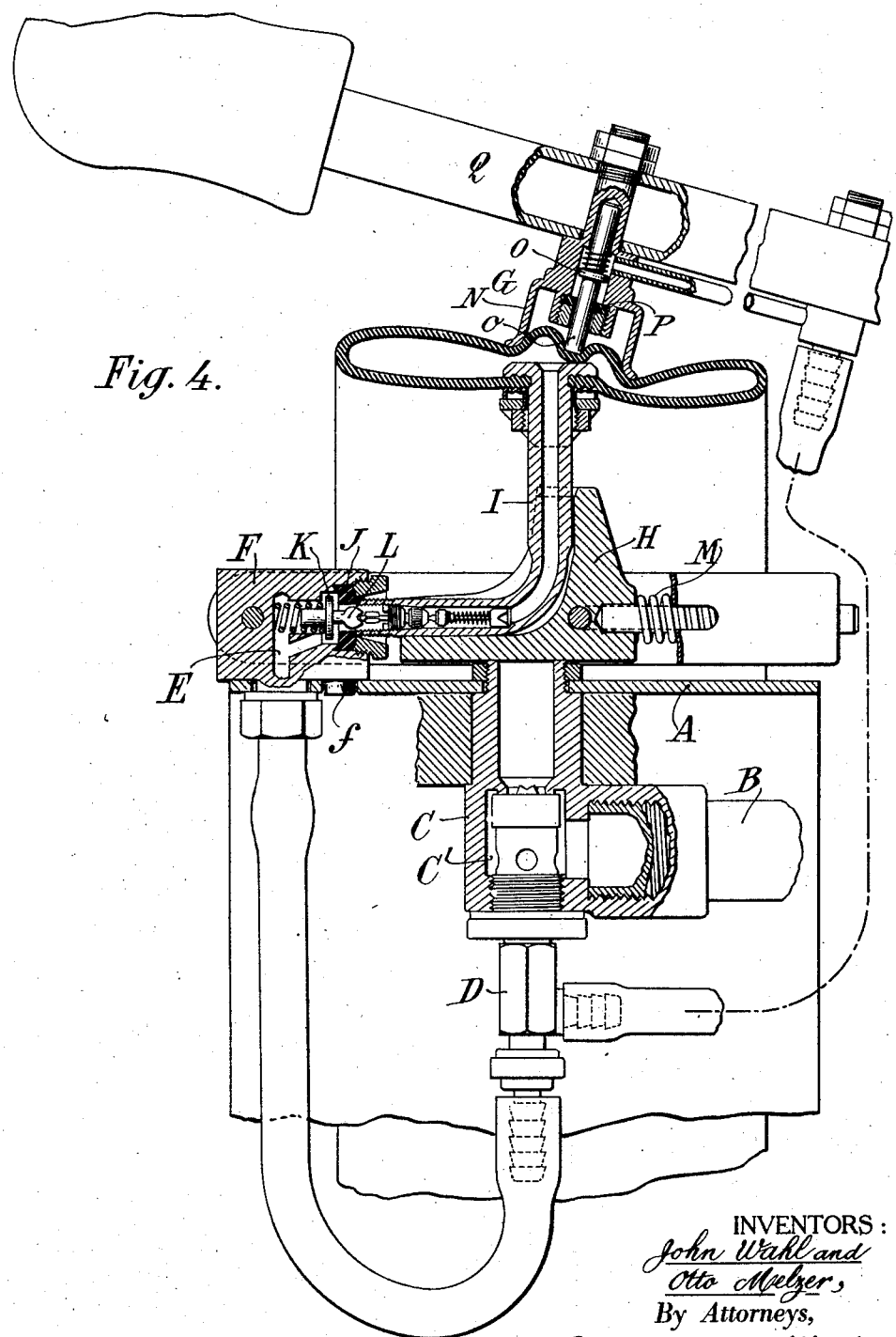

1,658,314

UNITED STATES PATENT OFFICE.

JOHN WAHL, OF ROSEDALE, AND OTTO MELZER, OF HOLLIS, NEW YORK, ASSIGNORS TO A. SCHRADER'S SON, INC., OF BROOKLYN, NEW YORK, A CORPORATION OF NEW YORK.

TIRE-DEFLATING MACHINE.

Application filed December 30, 1924, Serial No. 758,894. Renewed November 17, 1927.

The invention relates to a tire deflating machine of the general type disclosed in the patents to Henry P. Kraft, Nos. 1,297,186 and 1,405,230, and aims to provide certain improvements therein. More specifically, it relates to the means in such machines for holding the walls of the tire separated at the foot of the tire valve until substantially all of the air is exhausted from the tire.

In the machines illustrated and described in the aforesaid patents, the means for accomplishing this result consists of a series of pivoted arms and levers which have to be positioned between the tire and the opposite sides of the foot of the valve stem to hold the tire wall spaced apart during the exhausting operation, and said arms and levers must be released after the deflating operation is completed.

According to the present invention, we provide an easily operable means which comprises a suction device, which, when brought into contact with the tire wall preferably opposite to the foot portion of the tire valve stem, causes a separation of the tire walls at said point and holds said walls apart until substantially all the air is exhausted from the tire. The present invention may be in the nature of an attachment to the machines of the aforesaid patents. The invention also includes other features of novelty which will be hereinafter pointed out.

In the accompanying drawings, we have shown a preferred embodiment of our invention applied to a machine of the type disclosed in the aforesaid patents which have been provided with an attachment adapting said machines for use with tires having either straight or bent valves, as disclosed in our co-pending application Serial No. 730,779, filed August 7, 1924.

In the accompanying drawings,

Fig. 4 is an enlarged view of Fig. 1, the parts being shown mainly in section.

Figure 1:
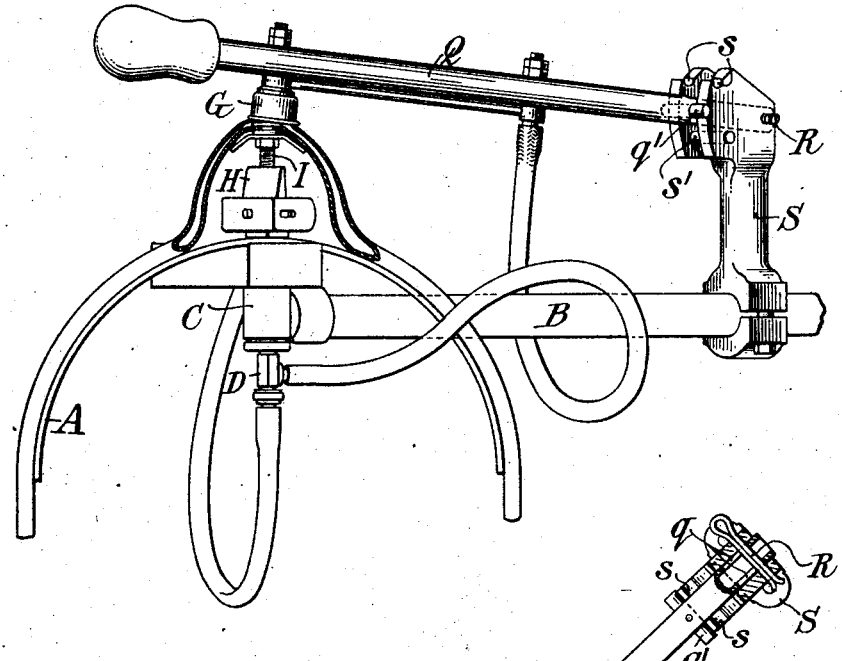
Figure 1 is an elevation of a tube support similar to that shown in our co-pending application, having the device of the present invention applied thereto, a tube being shown as mounted thereon in the position for deflation.
Figure 2:
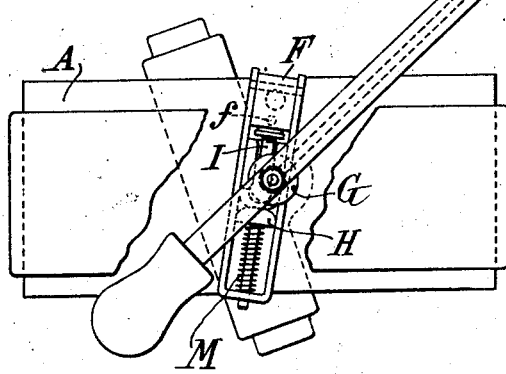
Fig. 2 is a top plan view of Fig. 1.

Referring to the drawings, let A indicate a support or saddle for the tube, which is in the nature of a band of metal curved in form, around which the tube is stretched, and B is a pipe leading to some form of exhaust or suction apparatus (not shown). The pipe B is connected with a member C provided with a valve chamber C', to which is coupled a T-fitting D, one branch of which is connected by suitable tubing with a valve chamber E formed in a socket member F, and the other branch connected by suitable tubing to a suction device G.

The socket member F constitutes a part of an attachment H adapted to receive an angular or bent valve I for the purpose of deflating a tire to which said valve is attached. This attachment H constitutes part of the novelty of our co-pending application aforesaid, and for a full and complete description thereof, reference is to be had thereto.

Briefly, the socket member F is pivotally carried by the support or saddle A and is held against relative movement by a lug $f$ seating within an opening in said saddle. Within the valve chamber E of the socket member F is a packing gasket J and a spring-pressed valve K normally seating against said packing notwithstanding the suction action on said valve tending to unseat it, and provided with a tire valve unseating member L adapted to engage the valve pin within the valve stem I to unseat the same. The free end of the valve stem is pressed against the valve packing J through the action of a heavy spring M normally acting to urge the attachment H toward the socket F, and during such action the valve K is also unseated by coming into engagement with the valve stem I, thus providing through communication between the tire and the exhaust or suction apparatus. Where a tire provided with a straight stem is to be deflated, the socket F and member H are moved to one side to expose the opening in the socket member C for the reception of the valve stem. Within the valve chamber C' of the socket C there is provided a spring-pressed valve (not shown) similar to that mounted within the valve chamber E. As thus far described, the device corresponds substantially to those described in the aforesaid patents and co-pending application.

According to the present invention, we provide improved means for holding the walls of the tire spaced apart so as to insure a vent passage during the exhausting of the air from the tire. These means, as we have shown them, consist of a suitable suction device preferably in the form of a cup N, within which there is mounted a spring-pressed valve O normally held against its packing seat P notwithstanding that the valve chamber is in communication with an exhaust device.

The suction device G is preferably carried by a lever Q mounted for pivotal movement in a substantially vertical plane about its pivot R, which is supported by a suitable bracket S, herein shown as carried by the exhaust pipe B. It is obvious, however, that the lever may be mounted in any other desired or convenient manner. The valve O is provided with a valve pin $o$ which, when the valve is seated, extends beyond the plane of the open end of the cup N and is adapted to be unseated by being brought into engagement with any sort of abutment. Preferably, the lever Q is weighted so that in its downward movement the valve pin $o$, upon coming into contact with an abutment, will be unseated and so held without the further intervention of an operator.

The suction means G is preferably supported at such point on the lever Q so that when said lever is brought down into proximity to a tire stretched over the saddle A, the valve will be unseated when the valve pin $o$ engages the foot portion of the tire through the wall opposite said foot portion of the valve stem I, and preferably to one side of the central opening in said valve stem through which the air is exhausted from the tire. When the valve O is thus unseated, the air is sucked out of the cup N, and the wall of the tire in engagement with the peripheral edge of the cup is sucked into the cup, as best shown in Fig. 4, and thus provides an unobstructed vent passage at the foot of the tire valve until substantially all of the air is exhausted from the tire. When this last stated condition is attained, it is found that the portion of the wall of the tire held by the suction cup N is released therefrom, due, probably, to the atmospheric pressure acting on the exterior of the tire adjacent the periphery of the cup and the weight of the tire wall within the cup. The releasing of the tire wall in this manner facilitates the removal of the collapsed tire from the support.

Figure 3:
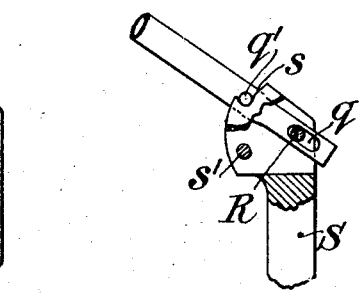
Fig. 3 is a detailed view of one of the elements of the device.

To further facilitate the operations, the lever Q, in addition to being pivotally mounted as described, is also adapted for limited longitudinal movement with respect to its pivot R, by being provided with an elongated slot $q$ (shown in Fig. 3). The lever Q is also provided with a transverse pin $q'$ somewhat in advance of the slot $q$, adapted to seat, when the lever is in inactive or raised position, in the saddles or depressions $s$ formed in the top faces of the bracket support S. A pin $s'$ which extends transversely of the support somewhat below the saddles $s$ serves to limit the downward movement of the lever Q, and thus protects the suction means G from inquiry should the lever be accidentally displaced from its inactive position.

In the operation of the machine, which is usually provided with twelve or more sockets radially disposed from a central hub, an operator first inserts the valve stem of a tire into a socket, then supports the tire over the saddle. The weight of the tire causes the unseating of the tire valve and the check valve within the socket, where straight valve stems are used, and the spring M accomplishes this where bent valve stems are used, the unseating of the valves thus establishing communication between the interior of the tire and the exhaust device. The lever Q is then unseated from its saddles $s$ and brought down into engagement with the tire opposite the valve stem, whereupon, due to the suction action within the cup N, the wall of the tire opposite the foot portion of the valve stem is drawn away from said foot portion, thereby providing an unobstructed exit for the exhausting air. The machine, which rotates in a circle about its hub, presents the tire supports in succession to the operator at a given point, and a second operator stationed at a distant point, whereat the tire, which when it reaches him will be in a completely deflated condition, is removed.

While we have shown and described a preferred embodiment of our invention, it will be understood that we do not wish to be limited to the specific means disclosed, since modification thereof may be resorted to without departing from the spirit of the invention.

What we claim is:

1. A deflating machine for pneumatic tire tubes or the like, comprising a connection to receive a tire valve casing, suction means communicating with said connection, and additional suction means cooperating with the outer wall of a tire to hold the tire walls separated until substantially all the air is exhausted from the tire.

2. A deflating machine for pneumatic tire tubes or the like, comprising a connection to receive a tire valve casing, suction means communicating with said connection, and additional suction means cooperating with the outer wall of a tire in proximity to the foot portion of the valve casing to hold the tire walls separated until all the air is exhausted from the tire.

3. In a deflating machine for tire tubes or the like, means adapted to exhaust the air from a tire tube through its valve casing, and suction means cooperating with the exterior of the tire tube to maintain the walls thereof spaced apart near the foot of the valve casing to provide a vent passage for the air within the tube while exhausting the air therefrom.

4. In a deflating machine for tire tubes or the like, means for exhausting the air from a tire tube through its valve casing, and a suction cup adapted to engage the outer wall of the tire tube at the point opposite the foot portion of the tire valve casing, to hold the tire walls separated until substantially all the air is exhausted from the tire tube.

5. In a deflating machine for tire tubes or the like, means for exhausting the air from a tire tube through its valve casing, a suction cup adapted to engage the outer wall of the tire tube at the point opposite the foot portion of the tire valve casing, to hold the tire walls separated until substantially all the air is exhausted from the tire tube, and a check valve in said suction cup adapted to be unseated by the foot portion of the tire valve casing.

6. In a deflating machine for tire tubes or the like, means for exhausting the air from a tire tube through its valve casing, a suction cup adapted to engage the outer wall of the tire tube at the point opposite the foot portion of the tire valve casing, to hold the tire walls separated until substantially all the air is exhausted from the tire tube, the circumferential edge of the suction cup encompassing the opening in the foot portion of the valve casing when said cup is in engagement with the tire.

7. In a deflating machine for tire tubes or the like, means for exhausting the air from a tire tube through its valve casing, a suction cup adapted to engage the outer wall of the tire tube at the point opposite the foot portion of the tire valve casing, to hold the tire walls separated until substantially all the air is exhausted from tire tube, a check valve in said suction cup adapted to be unseated by the foot portion of the tire valve casing, and the circumferential edge of the suction cup encompassing the opening in the foot portion of the valve casing when said valve is unseated thereby.

8. A deflating machine for pneumatic tire tubes or the like, comprising means for receiving a valve casing, suction means communicating with said first-named means, a second suction means adapted to cooperate with the exterior of a tire tube to provide a vent passage for the air therein while exhausting the air therefrom, and a common exhaust pipe connecting the two suction means with an exhaust device.

9. A deflating machine for pneumatic tires or the like, comprising a connection for receiving a valve casing of an inner tube, a pivoted lever, and suction means carried by the pivoted lever adapted to be brought into cooperative engagement with the top of a tire tube in proximity to the valve casing to hold the wall of the tire spaced from said valve casing while exhausting the air from the tire.

10. A tire deflating machine, comprising a pivoted lever, a valve controlled suction means carried by said lever, the valve having a spring normally holding the valve seated, and a valve pin adapted to open the valve when brought into engagement with an abutment.

11. A tire deflating machine, comprising a pivoted lever adapted to be moved in a substantially vertical plane, a valve controlled suction means carried by said lever, the valve having a spring normally holding the valve seated, and a valve pin adapted to open the valve when brought into engagement with an abutment, the weight of the lever acting to maintain said valve in open position while the valve pin remains in engagement with the abutment.

In witness whereof, we have hereunto signed our names.

JOHN WAHL.
OTTO MELZER.